United States Patent [19]
Bani-Hashemi et al.

[11] Patent Number: 5,647,360
[45] Date of Patent: Jul. 15, 1997

[54] DIGITAL SUBTRACTION ANGIOGRAPHY FOR 3D DIAGNOSTIC IMAGING

[75] Inventors: Ali Reza Bani-Hashemi, Belle Mead; Sumitro Samaddar, Plainsboro; Dietmar Hentschel, Little Silver, all of N.J.

[73] Assignee: Siemens Corporate Research, Inc., Princeton, N.J.

[21] Appl. No.: 491,326

[22] Filed: Jun. 30, 1995

[51] Int. Cl.$^6$ ............................................. G06F 15/42
[52] U.S. Cl. ............... 128/653.1; 128/654; 364/413.14; 364/413.23; 364/413.19; 382/130
[58] Field of Search ........................ 382/130; 378/62; 364/413.14, 413.23, 413.22, 413.19, 413.2; 128/653.1, 653.3, 653.4, 654

[56] References Cited

U.S. PATENT DOCUMENTS

| | | |
|---|---|---|
| 4,425,580 | 1/1984 | Haendle et al. |
| 4,516,261 | 5/1985 | Harding et al. |
| 4,551,800 | 11/1985 | Riederer et al. |
| 4,559,557 | 12/1985 | Keyes et al. ............... 358/111 |
| 4,870,692 | 9/1989 | Zuiderveld et al. ............... 382/6 |
| 4,875,165 | 10/1989 | Fencil et al. |
| 4,885,688 | 12/1989 | Crawford |
| 4,903,705 | 2/1990 | Imamura et al. |
| 5,030,956 | 7/1991 | Murphy |
| 5,032,990 | 7/1991 | Eberhard et al. |
| 5,124,914 | 6/1992 | Grangeat |
| 5,148,499 | 9/1992 | Matsumura |
| 5,187,660 | 2/1993 | Civanlar |
| 5,241,471 | 8/1993 | Trousett et al. |
| 5,271,401 | 12/1993 | Fishman |
| 5,309,356 | 5/1994 | Nishide et al. |
| 5,412,563 | 5/1995 | Cline et al. |
| 5,481,653 | 1/1996 | Kashiwagi et al. |
| 5,490,221 | 2/1996 | Ransford et al. |

OTHER PUBLICATIONS

"Techniques for editing and visualizing CT-angiographic data", Hentschel et al., Visualization in Biomedical Computing 1994, 4–7 Oct. 1994, Rochester, MN, pp. 307–318.

*Primary Examiner*—Marvin M. Lateef
*Assistant Examiner*—Shawna J. Shaw
*Attorney, Agent, or Firm*—Lawrence C. Edelman

[57] ABSTRACT

The digital subtraction angiography method useful for three dimensional (3D) imaging of a selected volume of a body comprises the following steps. Acquiring first and second 3D data sets representative of an image of substantially the same selected volume in the body, the first and second data sets being acquired at different times corresponding to a pre- and a post injection of a contrast medium, respectively. Determining common reference points for spatially corresponding subvolumes in the data sets. Comparing in a 3D spatial manner data in subvolumes of the second data set with data in corresponding subvolumes in the first data set in order to determine a new reference point in each of the subvolumes of the first data set which results in a best match of the spatial similarity of the data in the corresponding subvolumes of the second data set. Spatially interpolating new data for the subvolumes of said first data set using the new reference points determined above and the originally acquired data of the first data set, thereby generating a new first data set for the volume. Subtracting the new first data set from said second data set, for generating a subtraction data set representative of a 3D image of said selected volume in which said given portion is accentuated.

16 Claims, 3 Drawing Sheets

DIGITAL SUBTRACTION ANGIOGRAPHY FOR 3D DIAGNOSTIC IMAGING

BACKGROUND OF THE INVENTION

1. Field of the Invention

This invention relates to the processing of three-dimensional images generated by imaging devices, such as computer tomography (CT) and magnetic resonance (MR) imaging systems, and more specifically, to three-dimensional digital subtraction angiography.

2. Background of the Invention

Diagnostic imaging, and in particular medical diagnostic imaging, is generally provided by CT and MR systems, as well as those using positron emission tomography (PET), and other techniques. One particularly desirable use for such systems is the imaging of blood vessels in a patient, i.e. vascular imaging. Vascular imaging methods include two-dimensional (2D) techniques, as well as reconstruction of three-dimensional (3D) images from 2D image data acquired from such diagnostic imaging systems. In CT medical diagnosis, for example, 3D reconstruction of computed tomograms is particularly useful for visualizing blood vessels.

Conventional (2D) angiography is considered the most accurate technique for medical diagnosis of vascular structures and remains the standard against which other methods are compared. However, conventional angiography is an invasive technique and therefor presents a certain amount of risk. Accurate evaluation of the vascular system with non-invasive techniques remains an important goal. Thus, duplex ultrasound is often used for evaluation of blood flow in carotid arteries. Magnetic resonance angiography is also used for detailed evaluation of the vascular system. However, both of these techniques have limitations and alternative noninvasive approaches continue to be investigated.

Spiral computed tomography (CT) is a relatively new approach to CT that allows continuous data collection while a subject is advanced through the CT gantry. This provides an uninterrupted volume of data. From this data, multiple contiguous or overlapping sections of arbitrary thickness can be reconstructed. Spiral CT permits acquisition of a large volume of data in seconds. With spiral CT angiography (CTA), vascular structures can be selectively visualized by choosing an appropriate delay after injection of a contrast material. This gives excellent visualization of vessel lumina, stenoses, and lesions. The acquired data can then be displayed using 3D visualization techniques (e.g., volume-rendering, maximum intensity projection (MIP), and shaded surface display) to give an image of the vasculature. In contrast to conventional angiography, CTA is three-dimensional, thus giving the viewer more freedom to see the vasculature from different viewpoints. In view of this viewpoint freedom, a key task in CTA is to suppress as much data representative of bone from the CT data as possible, without suppression of data representative of the vasculature.

Maximum Intensity Projection (MIP) is a commonly used technique for displaying 3D vascular image data. MIP relies on blood in the vessels having a higher display pixel intensity than other organs in the imaged anatomy. This relationship, however, may not be obtainable for certain types of tissue, depending upon the modality of the imaging device. For example, in CT imaging, wherein a contrast agent is injected into the blood vessels to enhance their x-ray visibility, the coefficient of absorption of the bones, and hence their pixel intensity on the CT display, tends to be of a higher value (in Houndsfield units) than that of the contrast enhanced blood vessels. An analogous problem exists with MR and emission imaging systems. Thus, in many instances, in order to provide an unobstructed view of the vasculature, structures having pixel intensity values similar to or higher than that of the blood vessels must be removed. In accordance with current 3D imaging techniques, this removal is accomplished by post-imaging editing of the acquired image data. The 3D editing task is particularly important for the suppression of bone and other dense tissues, such as calcification, which appear in the acquired data and must be removed/suppressed in order to visualize the data representative of the vessels of interest without obstruction.

Current 3D CT imaging techniques, such as spiral CT angiography (CTA), commonly employ either automatic or semi-automatic post-imaging editing techniques to remove/ suppress non-vascular image data. Editing techniques are particularly reliable for removing those portions of the image data which are not of interest. Although CT angiography is a valuable diagnostic tool for vascular imaging, there are several problems. Firstly, as noted above, bone and other dense tissues usually obscure the opacified (contrast enhanced) blood vessels, and secondly, high doses of contrast agent are needed in order to reach the blood vessels in the imaged area. Furthermore, the editing techniques of the prior art solutions require varying amounts of user interaction in order to edit the data and remove unwanted portions from the region of interest.

More specifically, one reliable prior art method for removing undesirable image structures utilizes manual editing methods. These methods employ an expert who manually draws outlines of the structures to be removed on every image slice, using careful, hand-directed cursor manipulations. A major disadvantage of such methods is that manual editing is a repetitive, and therefore very time-consuming process. Since 3D CT imaging develops a large number of image slices to be edited, manual editing consumes expensive machine and operator time, and is therefore undesirable.

Numerous other interactive schemes and methods have been proposed in the prior art to help users edit images more efficiently. One example of such a method is described in an article entitled AN IMAGE EDITOR FOR A 3D-CT RECONSTRUCTION SYSTEM by Jay Ezrielev et al. published in Proceedings of Medical Imaging IV, Image Processing, Newport Beach, 1990, Vol. 1233. An image editing system is described which utilizes intelligent and semi-automatic methods, such as thresholding operations, for removing simple objects from the image data set.

Another CT image editing method is described in an article published in IEEE Computer Graphics and Applications, November 1991, entitled EDITING TOOLS FOR 3D MEDICAL IMAGING by Derek R. Ney et al. An editing method is described which is patterned after a paint and draw program. The editing method lets the user interactively create shapes manually, which are then used to define volumes of interest to be edited in the image data set.

More recently, a faster and more user-friendly interactive editing method has been developed, as described in U.S. patent application Ser. No. 08/055,614, filed Apr. 30, 1993. This editing method makes use of the ability to view several consecutive image slices as one superimposed image, which can then be visualized and manually edited. Thereafter, the editing of the superimposed image is automatically applied to the individual image slices. In a further improvement to this prior art editing method, an outline of the regions to be removed from the CT images can be carried out automatically by a thresholding or comparison operation.

Although such manual and semi-automatic editing techniques greatly improve the visualization of the blood vessels in view of bone and other dense tissues, it is quite unlikely that any of these editing techniques will become completely automatic or will succeed to remove calcification.

Furthermore, most editing approaches introduce the potential for loss or distortion of information when a connectivity algorithm uses too low a threshold to exclude bones physically touched by the vessels, or when the editing procedure attempts to suppress a vessel wall calcification that contacts the vessel lumen. Moreover, editing often requires an average 15–30 minutes of operator time and, in some cases, such as the petrous carotid region, may even take hours. Finally, the quality of the editing is subjective, and depends upon the experiences of the editor. For example, to successfully separate intramural calcium from intraluminal contrast material requires reference to the unenhanced images.

Additionally, with conventional CT angiography high levels of contrast media are introduced intravenously to the patient in order to opacify the blood vessels. Such high levels of contrast agent are undesirable in that patients with heart, and/or kidney problems are at particular risk due to the introduction of the contrast agent.

It is desirable to provide a method and apparatus which would improve the quality of the vascular images produced using 3D imaging techniques.

It is also desirable that the improvement result by an automatic, rather than semi-automatic or manual processing of the acquired data set.

Furthermore, in CT applications, it is desirable to reduce the concentration of the contrast medium needed to opacify the blood vessels in the region of interest.

It is noted that one technique currently used for 2D vascular imaging uses image subtraction techniques, and is commonly referred to as digital subtraction angiography (DSA). Current thinking does not suggest an extension of such 2D DSA techniques to a 3D imaging system since 2D imaging has a relatively fast image acquisition time period, on the order of a fraction of a second to several seconds, while 3D imaging techniques require approximately one minute or even more to acquire each image. Since DSA techniques require that two successive images be acquired (one with a contrast medium and one without), if image data is acquired using a 3D imaging technique there is a much greater chance of significant patient movement, thereby causing the subtracted image to have substantial movement-related artifacts. Additionally, 2D DSA techniques are generally considered as invasive procedures, while 3D imaging is considered a minimally-invasive imaging procedure. Thus, the extension of 2D DSA techniques to 3D imaging is not considered feasible.

It would be desirable to find a way to use the DSA techniques of 2D CT in a 3D system.

Furthermore, the use of digital subtraction angiography in 3D imaging systems would allow the level of contrast agent used to be significantly reduced, thereby greatly reducing the stress put on the heart and kidneys of the patient by the use of the contrast agent.

SUMMARY OF THE INVENTION

A digital subtraction angiography method useful for three dimensional (3D) imaging of a selected volume of a body comprises the following steps. Acquiring first and second 3D data sets representative of an image of substantially the same selected volume in the body, the first and second data sets being acquired at different times corresponding to a pre- and a post injection of a contrast medium, respectively. Determining common reference points for spatially corresponding subvolumes in the data sets. Comparing in a 3D spatial manner data in subvolumes of the second data set with data in corresponding subvolumes in the first data set in order to determine a new reference point in each of the subvolumes of the first data set which results in a best match of the spatial similarity of the data in the corresponding subvolumes of the second data set. Spatially interpolating new data for the subvolumes of the first data set using the new reference points determined above and the originally acquired data of the first data set, thereby generating a new first data set for the volume. Finally, subtracting the new first data set from the second data set, for generating a subtraction data set representative of a 3D image of the selected volume in which a portion including the contrast medium is accentuated.

These and other objects of the invention will become apparent from the description of the preferred embodiment of the invention and the claims.

For a fuller understanding of the present invention, reference should now be made to the following detailed description and the accompanying drawings.

DETAILED DESCRIPTION OF THE PREFERRED EMBODIMENT

Although the present invention is described in the embodiment of a spiral 3D CT angiography imaging system, it is contemplated that the present invention can also be adapted for use in other 3D CT systems, and in systems using other imaging techniques, such as magnetic resonance imaging systems.

Figure 1:
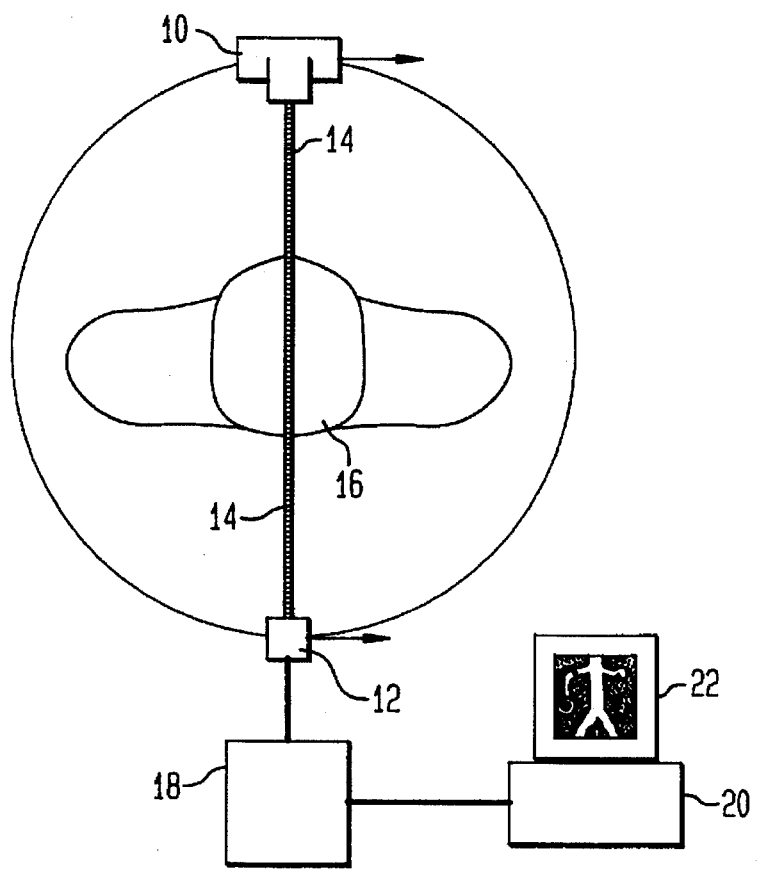
FIG. 1 is a schematic illustration of an imaging system constructed in accordance with an embodiment of the present invention.

A basic CT scanning apparatus for carrying out the method according to the present invention is well known in the art and generally comprises, as shown in FIG. 1, an x-ray tube 10 and a radiation detector 12, mounted on a gantry (not specifically shown) for rotational movement about the body of a subject 16 under study. As is well known in the art, in order to generate an image of a body slice of interest, the x-ray tube 10 projects a thin x-ray beam 14 through subject 16. The attenuation of the x-ray beam 14 is determined for a large number of paths through which x-ray beam 14 slices through subject 16. The radiation intensity is recorded by detector 12 for each slice beam 14 makes through subject 16. Detector 12 is coupled to measurement electronics 18 which codes the measurement values sensed by detector 12 into a suitable form. Measurement electronics 18 is coupled to a computer 20 which processes the coded measurement values and calculates a 3D attenuation distribution. The attenuation distribution generally comprises a numerical matrix which is stored by computer 20. Computer 20 is coupled to a television monitor 22 and associated video processing circuitry which converts the numerical matrix into an image which can be viewed by the operator. Each point or pixel of the image corresponds to an element of the matrix. As is well known in the art, the illuminating intensity value of each pixel represents the amount of attenuation caused by the body of the subject 16 scanned in the path of x-ray beam 14. Computer 18 includes a 3D visualization program which processes the stored image data enabling display 22 to visualize features of every image in the acquired image data, as is well known. For example, the 3D visualization system can display a three-dimensional surface projection of a volume of subject 16 under study based on the acquired image data.

The remainder of the description assumes that the image data signals depictive of the volume of interest in the subject under study have already been generated by an MR or CT device and have been stored in a memory associated with computer 20 as a set of digitized image planes forming the volume of interest.

The technique of the present invention utilizes digital subtraction angiography (DSA) techniques on the acquired 3D data. DSA uses two sets of data: the first set of data, called the mask volume, is obtained before opacification of the blood vessels by the contrast agent, whereas the second set of data, called the contrast volume, is acquired after the injection of the contrast agent. Next, the mask data is subtracted from the contrast data, eliminating all but the vessel data. If the position of the vessels in the mask and the contrast coincide, the subtraction produces a pure vascular tree image. One advantage of using digital subtraction techniques in CTA is that the concentration of the contrast agent may be reduced. In conventional 2D DSA, the concentration of contrast agent may be reduced by a factor of ten as compared with non-DSA angiography. There is good reason to believe that digital subtraction technique will offer a similar reduction of contrast agent in 3D CTA as well. How much reduction of contrast agent is possible remains to be determined during the clinical testing of the present technique.

In many cases where the subject can be kept immobile (such as in neuroangiography), DSA has been a successful technique. This ideal situation, however, is hardly ever encountered in three-dimensional CTA. In fact, many studies have demonstrated that patient motion is a strong limitation to the widespread use of image subtraction techniques.

Patient motion between the mask and contrast data acquisitions is hard to avoid. Typically a double scan CTA takes on the order of a few minutes. This includes scanning the first, mask, volume, preparing the patient and injecting the contrast medium, and scanning the second, contrast, volume. During this time it is likely that the patient moves.

Patient movement can be characterized into two types; one as rigid motion, and the other as nonrigid or flexible motion. The patient movement may be minimized by breath-holding and patient cooperation, however there are nonvoluntary movements such as muscle contractions that cannot be avoided. In addition to the patient motion, the patient support and x-ray gantry have limited repeatability, making it likely that they may not return to the exact same positions for the second scan. This introduces misregistration between the mask and contrast volumes.

In accordance with the present invention, a three-dimensional flexible registration technique is presented that can tolerate nonrigid misregistration, as well as intensity variations and rigid misregistrations between the mask and contrast volumes.

DETAIL DESCRIPTION

The flexible registration technique starts by automatically selecting a set of N uniformly distributed control points within the contrast volume. For each control point a neighborhood $B^n$ in the form of a subvolume is selected. This subvolume is used as a matching window. A similar subvolume around the same coordinates in the corresponding mask volume is selected. The center of each subvolume is identified by a point $p^n$. A transformation $W^n$ is computed that maps each $B^n$ in the contrast volume into a similar subvolume in the mask volume.

Figure 2:
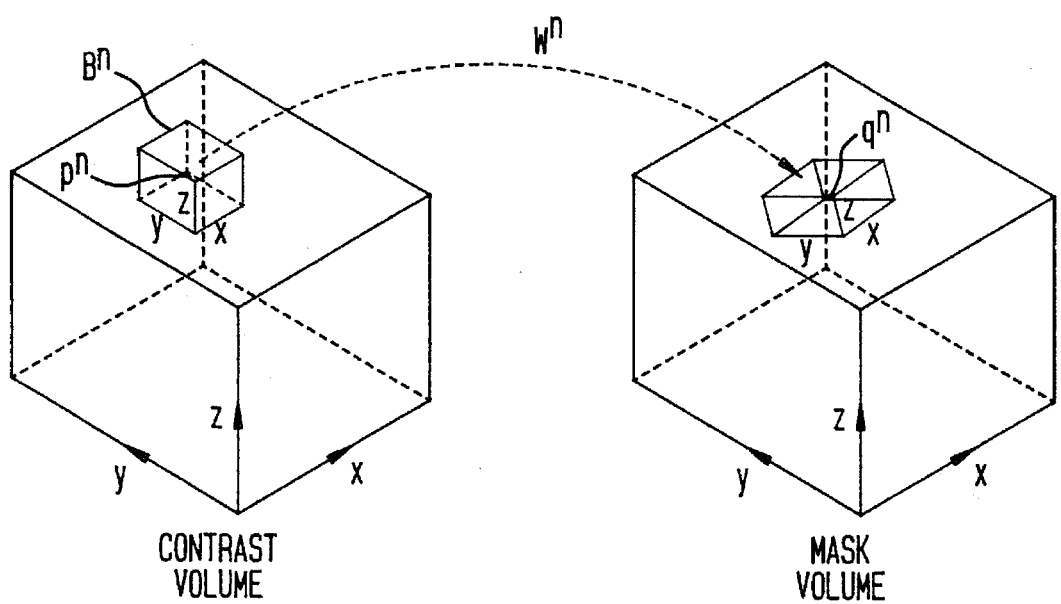
FIG. 2 is a graphical illustration useful for understanding the 3D flexible registration technique of the present invention.

FIG. 2 graphically illustrates the above described transformation. The transformation is computed based on the following matching criterion. First, each point of the subvolume $B^n$ is referred to as $p_m^n$, and the corresponding mapped point on the mask subvolume is referred to as $q_m^n$. For each subvolume $B^n$, a difference volume is computed by subtracting the intensity $(I_m)$ at each $q_m^n$ in the mask subvolume from the intensity $(I_c)$ at each $p_m^n$ in the contrast subvolume. This is shown in the following equation (1):

$$D^n(p_m^n) = I_c(p_m^n) - I_{mM}(q_m^n) \quad [1]$$

where $q_m^n = (q_{mx}^n, q_{my}^n, q_{mz}^n)$ is formed by mapping $p_m^n = (p_{mx}^n, p_{my}^n, p_{mz}^n)$ using transformation $W^n$. The transformation $W^n$ is in turn composed of three transformations; scaling, rotation, and translation. $W^n$ is a homogeneous transformation matrix represented by the following equation (2):

$$W^n = \begin{bmatrix} 1 & 0 & 0 & t_x^n \\ 0 & 1 & 0 & t_y^n \\ 0 & 0 & 1 & t_z^n \\ 0 & 0 & 0 & 1 \end{bmatrix} \begin{bmatrix} r_{11}^n & r_{12}^n & r_{13}^n & 0 \\ r_{21}^n & r_{22}^n & r_{23}^n & 0 \\ r_{31}^n & r_{32}^n & r_{33}^n & 0 \\ 0 & 0 & 0 & 1 \end{bmatrix} \begin{bmatrix} s_x^n & 0 & 0 & 0 \\ 0 & s_y^n & 0 & 0 \\ 0 & 0 & s_z^n & 0 \\ 0 & 0 & 0 & 1 \end{bmatrix} \quad (2)$$

The mapping from $p_m^n$ in the contrast volume to $q_m^n$ in the mask volume is based on a homogeneous transformation, shown as equation 3:

$$\begin{bmatrix} q_{mx}^n \\ q_{my}^n \\ q_{mz}^n \\ 1 \end{bmatrix} = \begin{bmatrix} 1 & 0 & 0 & t_x^n \\ 0 & 1 & 0 & t_y^n \\ 0 & 0 & 1 & t_z^n \\ 0 & 0 & 0 & 1 \end{bmatrix} \begin{bmatrix} r_{11}^n & r_{12}^n & r_{13}^n & 0 \\ r_{21}^n & r_{22}^n & r_{23}^n & 0 \\ r_{31}^n & r_{32}^n & r_{33}^n & 0 \\ 0 & 0 & 0 & 1 \end{bmatrix} \begin{bmatrix} s_x^n & 0 & 0 & 0 \\ 0 & s_y^n & 0 & 0 \\ 0 & 0 & s_z^n & 0 \\ 0 & 0 & 0 & 1 \end{bmatrix} \begin{bmatrix} p_{mx}^n \\ p_{my}^n \\ p_{mz}^n \\ 1 \end{bmatrix} \quad (3)$$

A best-match-criterion (BMC) is computed based on deterministic-sign-change criterion (DSC). DSC is computed by adding a checker-board pattern to the subtracted subvolume in equation 1. This is shown by the following equation 4:

$$D^n_{dsc}[i,j,k] + (-1)^{i,j,k} K \quad [4]$$

In this equation i, j and k are indices to the voxels in the subvolume. The constant K depends on image statistics. The best-match-criterion (BMC) is defined to be the maximum number of sign-changes in the subvolume $D^n_{dsc}$. Further description of the BMC will be provided later section of this description.

A subtraction volume D(p) is computed as shown by the following equation 5. In equation 5, $I_c(p)$ and $I_m(q)$ are the contrast and mask intensities at center points p and q, respectively, while $q=W_p$:

$$D(p)=I_c(p)-I_m(q) \quad [5]$$

Use of a larger number of center points implies a greater accuracy in determining the warping, as well as a corresponding increase in computational cost. Thus, there is a tradeoff between registration accuracy and computational cost.

Thus, as described above and shown in FIG. 2, the flexible image registration processing in accordance with the present invention, independently determines the optimum transformation $W^n$ for each of the subvolumes $B^n$, thereby mapping from the center point $p^n$ in a contrast subvolume to the center point $q^n$ in a mask subvolume. Since, due to the transformations, the boundaries of the subvolumes are not predetermined, transformations corresponding to all the points falling in-between these center points are computed by tri-linear interpolation among the center points of neighboring subvolumes, thereby completing the mapping.

FLOW CHART

As noted above, the present technique is a flexible registration, or image warping, that transforms the mask volume to be a best match to the contrast volume. The mask volume will not exactly match the contrast volume for a number of reasons. Most importantly, corresponding regions will not match due to presence of blood vessels in the contrast data. As well known, it is this phenomena that is relied on to produce the images of interest in DSA. In addition, the contrast and mask volumes will have different intensities due to X-ray intensity fluctuates from one scan to the other. This makes it difficult to measure similarities between corresponding regions.

Figure 3:
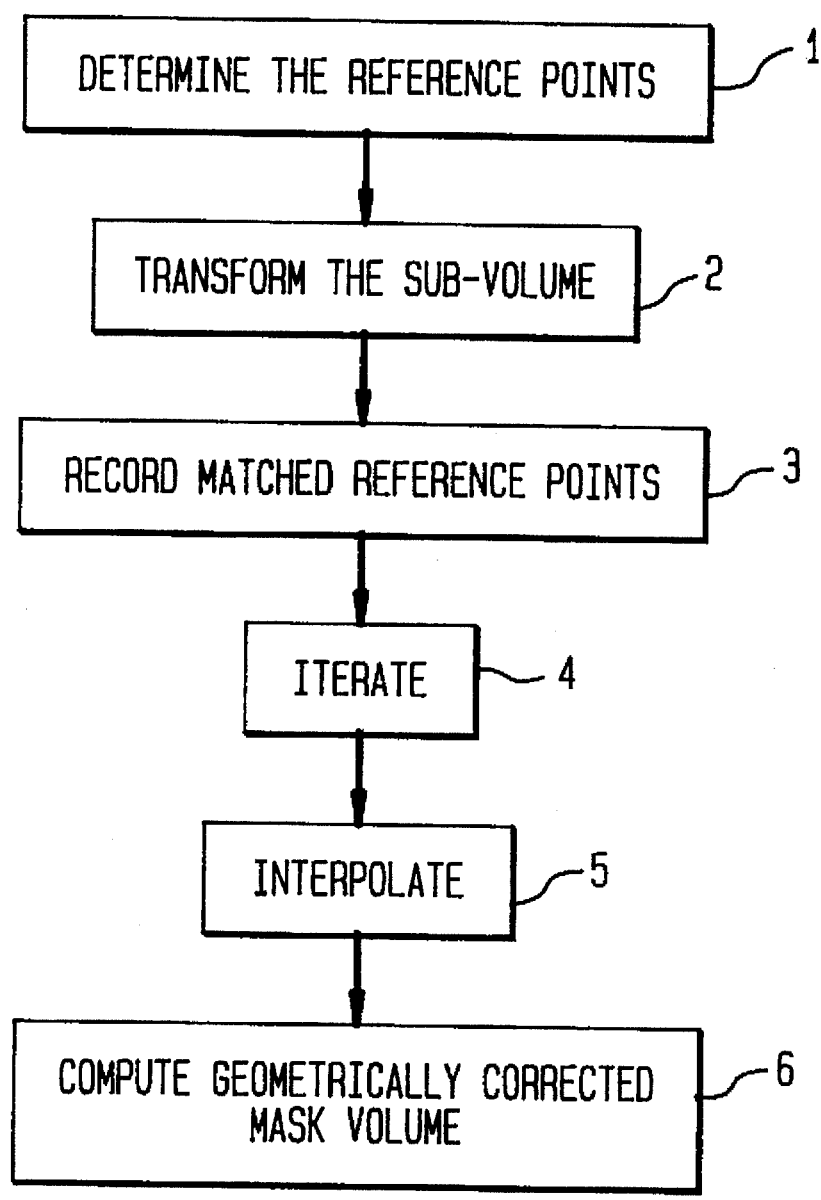
FIG. 3 is a flow chart of the 3D flexible registration technique of the present invention.

In conjunction with the following description, the reader should now refer to FIG. 3, which illustrates a flow chart of the flexible 3D registration technique of the present invention.

Step 1) Determine the Reference Points

These points are chosen every N voxels along the three axes of the contrast volume, forming a 3D array of points. The number N is determined by the user and specifies the distance between reference points. The choice of N is purely empirical. In applicant's experiments N was chosen to be 16. For each of the reference points a match subvolume $B^n$ is selected, with the reference point at the center. This subvolume is used as a search window to find the best matched point in the mask volume. Note, it is the mask volume that is registered to the contrast volume, and not visa versa, because the contrast volume has the best image data due to the use of the contrast agent.

The optimum size of the match subvolume depends on the level of detail, i.e., the size of the blood vessels, in the volume. There is no precise rule for choosing the size of match subvolume $B^n$. In general, volumes having a large amount of low spatial frequency components will require a bigger search size than volumes having a large amount of high spatial frequency components. An empirical criterion is to select the size of the subvolume such that it contains at least some highly visible details, i.e., at least a portion of the background (non-vessel).

Step 2) Transform the Subvolume

Step 2a) Translate

In this step a search block is fixed around every reference point in the contrast volume, while the mask volume is shifted under the search block until the best match is found. Then the location of the best match is recorded. The shifting is done along three axes with predetermined steps. Typically a 0.1 voxel shift is used. The shifting continues until a Best-Match-Criterion (BMC) is satisfied. Although there are many techniques for determining a best match, in the preferred embodiment, deterministic-sign-change is a function of the difference between the contrast and mask subvolumes that is maximized in order to achieve the best match. The function optimization is carried out using, for example, the "direction set method" described by R. P. Brent in his book entitled *Algorithms for Minimization Without Derivatives*, published by Prentice-Hall, Englewood Cliffs, N.J. 1973. Brent's direction set method uses conjugate directions and yields an optimum transformation. This method is a form of "gradient descent algorithm" and is described in greater detail later on along with a description of the BMC.

Step 2b) Rotate

This step is similar to step 2a, except that rotation is performed until BMC is satisfied. The rotation is done with predetermined steps about three axes for the best translation computed in Step 2a. Rotational steps of 0.5 degrees are typically selected.

Step 2c) Scale

In this step the subvolume is scaled along three axes to further optimize the BMC. The scaling is performed in predetermined steps. These steps are set by the user and a typical step size is 0.001.

Step 3) Record Matched Reference Point:

Record the center of the match subvolume after the BMC is achieved. This would provide the best local translation, rotation, and scaling that would bring the reference point in the mask volume to register with the reference point in the contrast volume.

Step 4) Iterate:

Repeat the process, starting from Step 2a), for each reference point.

Step 5) Interpolate:

The translation, rotation, and scaling computed for each reference point determines the transformation that must be applied to bring the reference points into registration. The voxels that fall between the reference points must have transformations as well. To determine the transformation for each voxel, tri-linear interpolation is applied based on neighboring reference points.

Step 6) Compute Geometrically Corrected Mask Volume:

Use the mapping computed in Step 5) to compute the geometrically corrected mask volume, and subtract it from the contrast volume. This is shown in equation 5.

BEST MATCHING CRITERION (BMC)

The choice of BMC is of utmost importance in this matching process. In conventional image registration, simple correlation techniques are used, the most common of which is the sum of absolute values of differences. Unfortunately, these methods work correctly only when the features of interest to be compared are nearly identical. This is not the case in DSA since vessels are present in the contrast data and they are absent in the mask data. The criterion for matching must be clever enough to only include the underlying features and exclude the differences caused by the vessels.

A class of similarity measures based on non-parametric statistical consideration is known which improves the registration performance over conventional methods such as the correlation function, see A. Venot et al, "A New Class of Similarity Measures for Robust Image Registration", published in *Computer Vision, Graphics, Image Processing*, 28:176–184, March 1984. When the noise level in the data is greater than the digitization precision, the stochastic sign change (SSC) criterion is applied by first taking the intensity value difference of two volumes at corresponding points, as shown in the following equation 6.

$$D_{ssc}(p) = I_c(p) - I_m(q) \quad [6]$$

Let's call $D_{ssc}$ the subtraction volume. If the contrast and mask volumes are perfectly registered, the subtraction image $D_{ssc}$ is just the superposition of noises from $I_c$ and $I_m$. If this superpositional noise is symmetrically distributed about zero, the statistically best registration coefficients correspond to the maximum number of sign changes in $D_{ssc}$.

When the noise levels are low, the subtraction image $D_{ssc}$ becomes null. A deterministic sign change (DSC) criterion is then applied. In order to produce a fixed pattern of sign changes, a fixed value K, determined by image statistics, is periodically added to or subtracted from the subtraction image $D_{ssc}$, as shown by the following equation 7.

$$D_{dsc}[i,j,k] = D_{ssc}[i,j,k] + (-1)^{i+j+k} K \quad [7]$$

The number of sign changes is then computed, and the selected registration coefficient corresponds to the maximum number of sign changes in $D_{dsc}$.

In equation 7 the constant K depends on the image statistics. The term $(-1)^{i+j+k} K$ introduces a checkerboard pattern that is added to the difference volume. As discussed earlier, if the noise variance is large, then the maximum number of sign-changes in the subtraction volume indicates the best match. However, if the noise level is too low, then there will not be sufficient number of sign-changes for a good judgement about the quality of the match. In this case the deterministic pattern $(-1)^{i+j+k} K$ gets added to the image, resulting in a number of sign-changes that become maximum for the best match.

Ideally, one would like to keep K as low as possible. Considering discrete (quantized) image intensity representation, one would want to keep K as low as 1. However, the two contrast and mask data sets have different intensity floors due to fluctuations of the X-ray, as well as the scatter effects caused by the contrast medium. There might be other reasons for mask and contrast data to have different intensity floors, however discussions about these reasons are beyond the scope of this patent. It suffices to mention that these variations result in an offset in the subtraction result. This offset is present even in the background regions where the contrast and mask are supposed to be identical. The optimum choice for K is equal to the amount of the offset. This guarantees a maximum number of sign-changes for the best match. It is important to note that increasing K beyond its optimum level increases the number of sign-changes, however, that increase does not correspond to better quality of match. In our experiments K has been set to be around 6.

We modified the basic DSC criterion to exclude those voxels from the DSC computation where the sign of the difference corresponds to vessels. In other words, addition of the checker-board pattern and computation of sign-changes is only done for voxels that do not contain vessels. The superiority of our version of DSC over traditional correlation techniques such as sum of absolute difference was confirmed experimentally as well.

DIRECTION SET METHOD IN MULTIDIMENSIONS

A true "gradient descent method" requires the computation of the gradient of the BMC. Usually BMC is maximized for best match, whereas gradient descent algorithms minimize some function. Hence, we use the negative values of BMC for minimization. Since, the BMC is a function of 9 variables (i.e. 3 translations, 3 rotations and 3 scalings), the computation of gradient is expensive. It would be computationally more effective if the function minimization could be carried out as a sequence of one-dimensional minimizations along conjugate or non-interfering directions such that minimization along one direction is not spoiled by subsequent minimization along another.

All direction set methods consist of prescriptions for starting with some arbitrary set of directions, typically unit vectors along each dimension. These methods then sequentially perform function minimization along each direction in the direction set. At the end of each iteration, this set of directions is updated, so that the direction set ultimately approaches the property of conjugate directions.

Brent's version of the method, previously noted, is probably the best known. After minimizing along each dimension, this method adds the direction corresponding to the net "motion in multidimensional space" to the direction set. This is the average direction moved after trying all possible directions in the direction set. For a valley whose long direction is twisting slowly, this direction is likely to give us a good run along the new long direction. Simultaneously, the method drops the direction along which the function made its largest DECREASE from the direction set. This seems paradoxical, since that direction was the best of the previous iteration. However, it is also likely to be a major component of the new direction that we are adding, so dropping it gives us the best chance of avoiding a buildup of linear dependence. Remember, we are trying to construct a set of directions which are linearly independent and mutually conjugate.

The computational complexity of the direction set method of function minimization depends on the number of dimensions on which minimization is carried out. The total degree of freedom for our registration problem is six, with three translations, two scalings and one rotation in the plane of projection. Our implementation allows the user to perform minimization only along certain dimensions if some a priori information about the nature of data is known. Thus, faster registration can be performed by varying only the translation parameters and holding the rotation and scaling parameters constant, usually to zero rotation and unity scaling. Scaling transformations are usually needed to account for organs such as heart, rib cage during breathing, etc. They are usually not necessary for head, neck, or abdominal studies. Rotation components can be subsumed by translation if we use a finer spacing of reference points and/or smaller search match window. The user is also allowed to specify the accuracy of each one-dimensional minimization. This is controlled by a parameter that specifies the smallest decrease in function value necessary to continue the minimization in a direction.

HIERARCHICAL REGISTRATION

Great computational advantage can be obtained by initially carrying out a coarse registration using fewer reference points with larger match subvolumes which were subsampled for the purpose of evaluating the BMC. Finer registration can then be performed by using a finer distribution of reference points with smaller match subvolumes with lesser (or no) subsampling and for fewer directions e.g. only for translation.

EXPERIMENTAL RESULTS

Three sets of studies have been used for experimentation. These studies have been collected using a Siemens SOMA- TOM PLUS-S. The acquisition parameters and details are not known to us. Each set consists of a pair of mask and contrast runs. The first data set consists of 57 slices covering the neck and a portion of the skull up to circle of Willis. Half of the data is related to the neck where much nonrigid motion exists. The upper half covers the skull base which can be considered rigid.

Figure 4A:
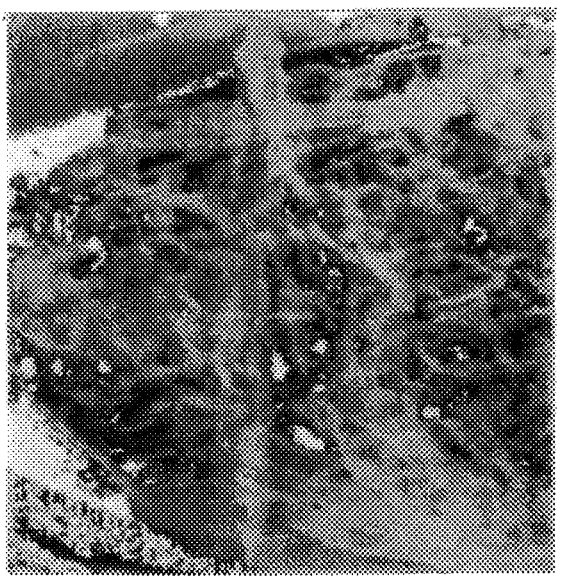
FIGS. 4A, 4B and 4C illustrate the results of 3D CT DSA without 3D registration, with rigid 3D registration, and, in accordance with the principles of the present invention, with flexible 3D registration, respectively.
Figure 4B:
Figure 4C:

FIG. 4A shows the result of subtracting a mask volume from a contrast volume. The result has been volume rendered. FIG. 4B shows a similar subtraction result after registration by means of rigid body transformations. FIG. 4C illustrates the result of subtraction after flexible registration in accordance with the present invention has been performed on the mask volume. Many of the artifacts due to nonrigid motion of the soft tissue as well as neck and jaw bones have been eliminated.

Thus, there has been shown and described a novel 3D image registration technique and apparatus which satisfies all the objects and advantages sought therefore. Many changes, modifications, variations and other uses and applications of the subject invention will, however, become apparent to those skilled in the art after considering this specification and its accompanying drawings, which disclose preferred embodiments thereof. For example, as previously noted, the registration technique can be useful in various imaging systems, such as CT, MR, PET, etc. All such changes, modifications, variations and other uses and applications which do not depart from the spirit and scope of the invention are deemed to be covered by this patent, which is limited only by the claims which follow as interpreted in light of the foregoing description.

We claim:

1. A digital subtraction angiography method useful for three dimensional (3D) imaging of a selected volume of a body, comprising the following steps:

acquiring first and second data sets of 3D data representative of an image of substantially the same selected volume in said body, said first and second data sets being acquired at different times corresponding to a pre- and a post, respectively, application of a process to said body to differentially affect imaging characteristics of at least a given portion of said selected volume;

determining common reference points for spatially corresponding subvolumes in said first and second data sets;

comparing in a 3D spatial manner data in subvolumes of said second data set with data in corresponding subvolumes in said first data set in order to determine a new reference point in each of said subvolumes of said first data set which results in a best match of the spatial similarity of the data in said corresponding subvolumes of said second data set;

spatially interpolating new data for the subvolumes of said first data set using said new reference points determined above and the originally acquired data of said first data set, thereby generating a new first data set for said volume;

subtracting said new first data set from said second data set, for generating a subtraction data set representative of a 3D image of said selected volume in which said given portion is accentuated; and applying said subtracted data set to a display device for displaying an image on said display device of said selected volume wherein said given portion is accentuated.

2. The method of claim 1, wherein said comparing step comprises 3D transformation of the spatial positioning of the data in said first data set before performing said comparing.

3. The method of claim 1, wherein said acquiring step includes a processing step for developing a gradient function of the data in said first and second data sets, and said comparing step comprises 3D transformation of the spatial positioning of the gradient function of the data in said first data set and comparing with the result of the gradient function applied to the data in said second data set.

4. The method of claim 2, wherein said 3D transformation step comprises 3D translation, 3D rotation, and 3D scaling in discreet fractional steps of the spatial positioning of the data in subvolumes of said first data set.

5. The method of claim 4, wherein said spatially interpolating step comprises tri-linear interpolation.

6. The method of claim 1, wherein said determining step and said comparing step are iteratively repeated until a best match criterion is satisfied, and then said new reference point is determined.

7. The method of claim 6, wherein said best match criterion comprises a maximization of a stochastic-sign-change function.

8. The method of claim 6, wherein said best match criterion comprises a maximization of a deterministic-sign-change function.

9. The method of claim 6, wherein said best match criterion comprises a minimization of the sum of squared differences.

10. The method of claim 6, wherein said best match criterion comprises a minimization of the sum of absolute differences.

11. The method of claim 8, wherein a checkerboard pattern is added to the result of said comparing step before evaluation of the deterministic-sign-change function.

12. The method of claim 1, wherein said acquiring step comprises exposing said selected volume to x-ray beams before and after injection of an x-ray contrast agent into blood vessels of said body, and determining respective first and second data sets of intensity values representative of an image of said selected volume.

13. A digital subtraction angiography apparatus adapted for three dimensional (3D) imaging of a selected volume of a body, comprising:

means for acquiring first and second data sets of 3D data representative of an image of substantially the same selected volume in said body, said first and second data sets being acquired at different times corresponding to a pre- and a post, respectively, application of a process to said body to differentially affect imaging characteristics of at least a given portion of said selected volume;

means for determining common reference points for spatially corresponding subvolumes in said first and second data sets;

means for comparing in a 3D spatial manner data in subvolumes of said second data set with data in corresponding subvolumes in said first data set in order to determine a new reference point in each of said subvolumes of said first data set which results in a best match of the spatial similarity of the data in said corresponding subvolumes of said second data set;

means for spatially interpolating new data for the subvolumes of said first data set using said new reference points determined above and the originally acquired data of said first data set, thereby generating a new first data set for said volume;

means for subtracting said new first data set from said second data set, for generating a subtraction data set representative of a 3D image of said selected volume in which said given portion is accentuated; and a display device responsive to said subtracted data set for displaying an image thereon of said selected volume wherein said given portion is accentuated.

14. The apparatus of claim 13, wherein said means for comparing includes transformation means for determining a 3D transformation of the spatial positioning of the data in said first data set before performing said comparing.

15. The apparatus of claim 14, wherein said transformation means includes means for 3D translation, 3D rotation, and 3D scaling in discreet fractional steps of the spatial positioning of the data in subvolumes of said first data set.

16. The apparatus of claim 13, wherein said acquiring means comprises an x-ray source for exposing said selected volume to x-ray beams before and after injection of an x-ray contrast agent into blood vessels of said body, and detector and measurement means for determining respective first and second data sets of intensity values representative of an image of said selected volume.

* * * * *